R. L. DRAKE.
HANDLE ASSEMBLING AND SOLDERING MACHINE.
APPLICATION FILED JAN. 3, 1920.
1,404,746.
Patented Jan. 31, 1922.
2 SHEETS—SHEET 1.
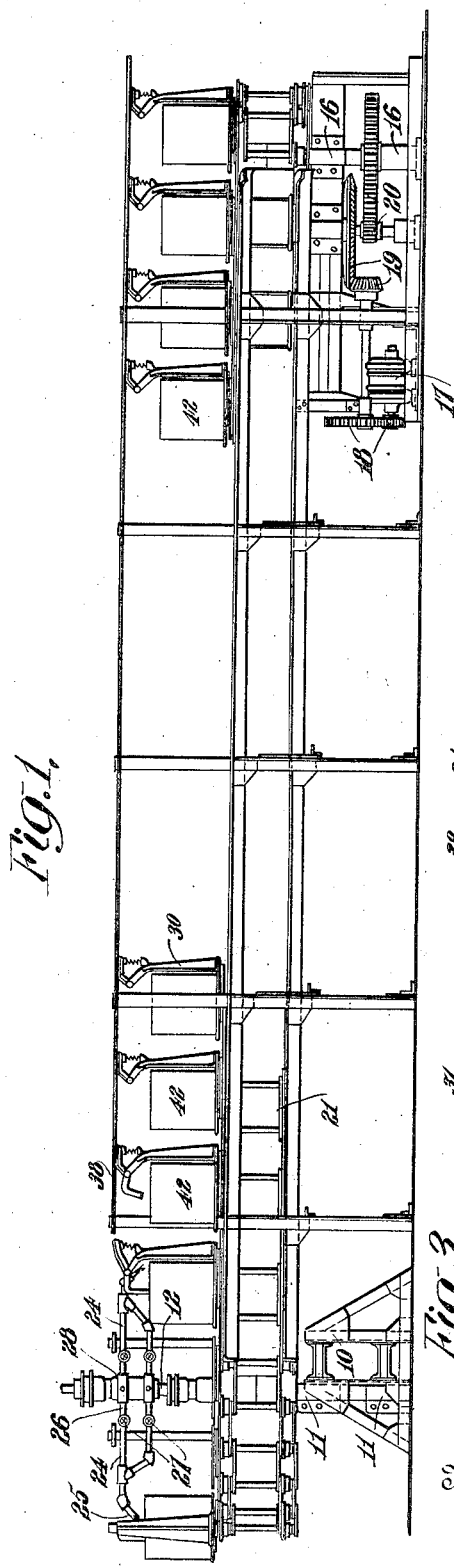
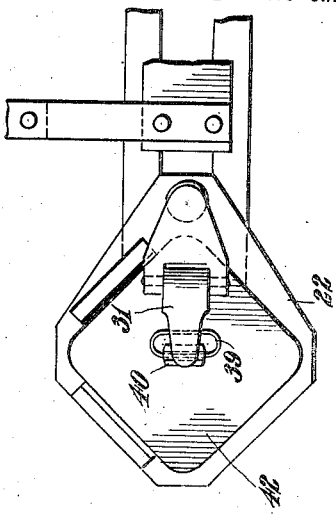
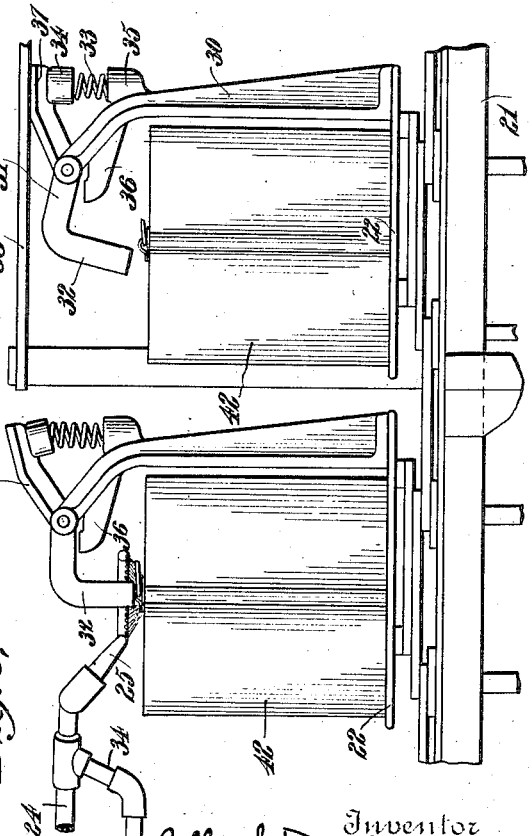
Inventor
Rollin L. Drake
By his Attorney

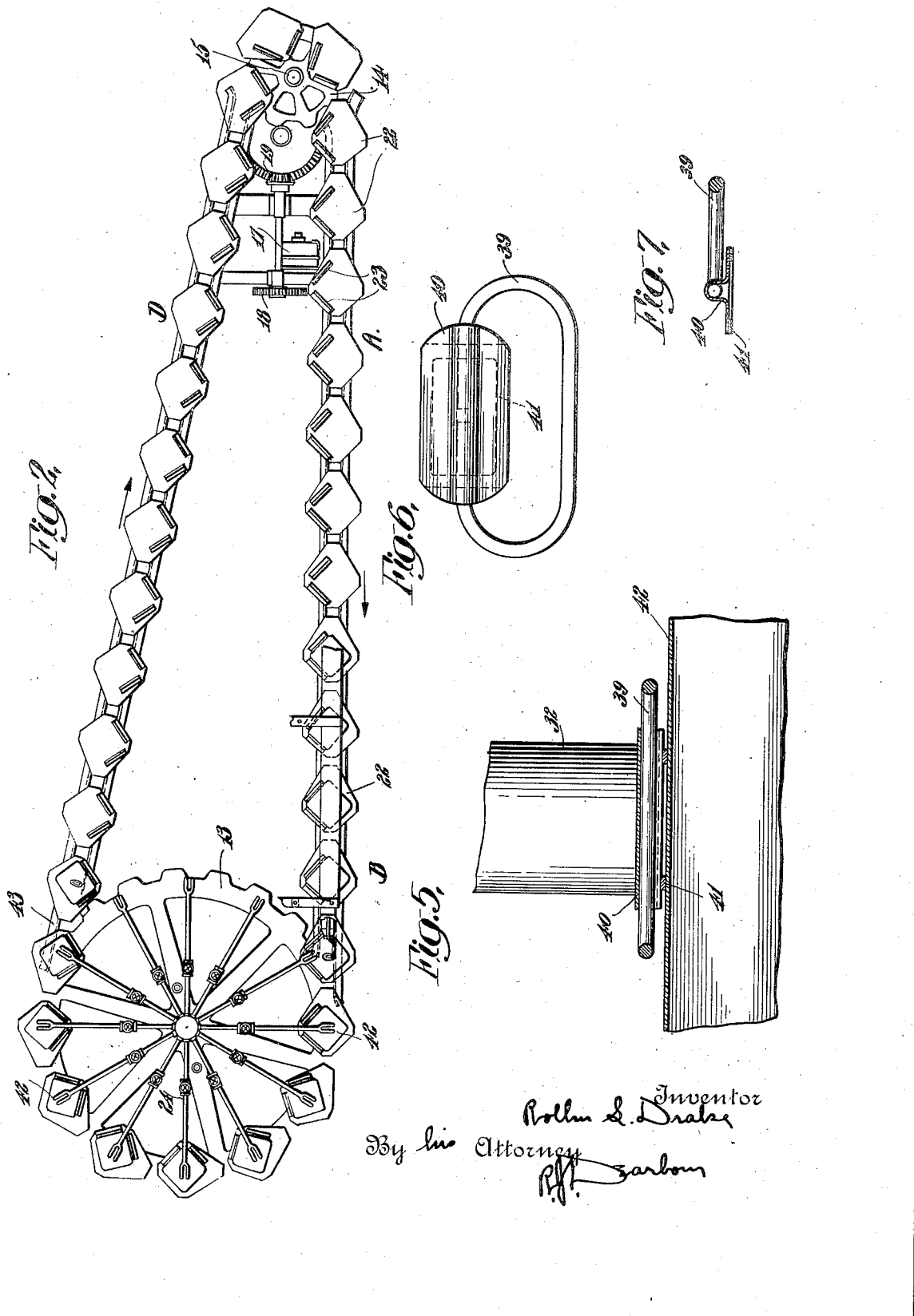

UNITED STATES PATENT OFFICE.

ROLLIN L. DRAKE, OF PORT ARTHUR, TEXAS, ASSIGNOR TO THE TEXAS COMPANY, OF NEW YORK, N. Y., A CORPORATION OF TEXAS.

HANDLE ASSEMBLING AND SOLDERING MACHINE.

1,404,746.     Specification of Letters Patent.     Patented Jan. 31, 1922.

Application filed January 3, 1920. Serial No. 349,201.

*To all whom it may concern:*

Be it known that I, ROLLIN L. DRAKE, a citizen of the United States, and a resident of Port Arthur, county of Jefferson, and State of Texas, have invented certain new and useful Improvements in Handle Assembling and Soldering Machines, of which the following is a specification.

My invention relates to machines or apparatus for soldering or attaching handles to sheet metal cans or containers.

One object of my invention is to provide a simple and durable machine adapted to rapidly and effectively solder handles onto tin cans, for example such as are used for dispensing oil, and which machine shall be arranged to accommodate a large number of cans at one time, and be continuous in operation.

In my copending application Serial No. 349,203, I have set forth a simple method for assembling handle parts and for soldering them to the can, and in my application Serial No. 349,202 I have shown and described a machine which is adapted for performing the first part of the aforesaid method, namely, the assembling of the handle parts together with a solder blank. My present invention pertains to an apparatus or machine which is particularly suitable for performing the last part of the aforesaid method, namely the soldering of the assembled handle to the can.

In order that my invention may be thoroughly understood, I will now proceed to describe the same in the following specification, and will then point out the novel features thereof in appended claims.

Referring to the drawings:

Figure 1 is an elevation of a handle soldering machine arranged and constructed in accordance with my invention and constituting one embodiment thereof.

Figure 2 is a plan view of the same machine.

Figure 3 is an elevation drawn to a larger scale and showing in detail one portion of the machine of the previous figures.

Figure 4 is a plan view corresponding to a portion of Figure 2 but drawn to the same scale as Figure 3.

Figure 5 is a sectional view on a still larger scale, the handle in position to be soldered to the surface of the can, and Figures 6 and 7 are detail views of the assembled handle parts ready to be applied to can.

The machine illustrated comprises a frame or support 10 having bearing blocks 11 in which a vertical shaft or spindle 12 is rotatably mounted. The shaft 12 carries an idler sprocket wheel 13 as clearly shown in Figure 2, a driving sprocket wheel 14 being secured to a shaft 15 near the opposite end of the machine. This shaft 15 is supported by bearings 16 and is driven by a motor 17 through the interposition of spur gears 18, bevel gears 19 and speed reduction gears 20. An endless chain or link belt 21 is in operative engagement with the sprocket wheels 13 and 15. Secured to alternate links of the chain are steel plates or flights 22 each of which is provided with lugs or guide projections 23 arranged to center a tin can or container on the flight.

The sprocket wheel 13 is provided with a superstructure composed of a plurality of radiating arms 24 terminating in burners 25, which are preferably in the form of perforated U-shaped tubes. Each of the arms is composed of gas and air pipes 26 having control valves 27 for regulating the amount of gas and air supplied to the burners at the ends of the arms. The arms are arranged to rotate with the sprocket wheel and are supplied through hollow shaft or hub 28, without interfering with the operation of the machine. The arms are arranged and proportioned so that the burners direct a flame onto the top of a can at the point where the handle is being attached.

Bracket or upright 30 is attached to each of the flights 22 and carries a holding lever 31 pivotally mounted thereon at its upper end. Each holding lever has the form of a bell crank and has a downwardly extending projection 32 which is adapted to engage the handle clip and press it downwardly upon the top of the can by reason of the action of a spring 33. This spring 33 is interposed between a spring socket 34 on the lever and a stationary spring socket 35 on the bracket 30, and a lug 36 on the bracket limits the rotative movement of the lever in response to the spring. A release bar 38 extends around the machine above the belt and each of the levers has a cam surface 37 which is adapted to engage said release bar 38 except at the end where the sprocket wheel 13 is located and where heat is applied to solder the handles in position.

The release bar is so positioned with reference to the bell crank levers that when the machine is in operation and the brackets 30 together with the flights 32 are carried under the release bar, the levers mounted on the brackets are successively cammed into release position by the engagement of the cam surface 37 with the under surface of the bar.

When the lever is disengaged from the release bar it is in position to hold the handle parts firmly on the top of the can as shown in Figure 3 at the left and is released when it comes into engagement with the release bar as shown in Figure 3 at the right.

The purpose of the handle soldering machine of my invention, as its name implies, is to attach assembled parts including handle 39, clip 40 and solder blank 41 to the tops of cans, such as 42, and the operation of the machine in accomplishing this result will now be described.

Assuming that the motor 17 is in operation, that the endless chain or belt is traveling in the direction of the arrows in Figure 2 and that the gas burners are lighted so that flames are being discharged from the ends of the rotating arms 24, cans such as 42 are placed on the flights 22 by an operator stationed at A. The operator places the cans in engagement with the lugs or projections 23 so that they are all properly centered. Another operator is stationed at B and places on the top of each can one of the assembled sets of handle parts as shown in Figure 7, just in position to be engaged by the finger 32 of the lever 31 as it is released from the bar 38.

The arrangement at this point is clearly shown in Figure 3 which corresponds to the location designated B in Figure 2. The attendant at this point places the assembled handle parts on a can as shown at the right in Figure 3 and holds them until they are engaged by the lever upon release of the latter from the release bar.

The cans then pass into the heating zone, a gas flame playing directly on the assembled handle parts and the top of the can engaged by them, while the can traverses a semicircle measured by the size of the sprocket wheel 13. Each of the gas flames is controlled so that the heat applied is sufficient to soften the solder and permit the handle clip on which it plays to be firmly soldered to the can as it is pressed downwardly by the spring pressed lever projection 32. Shortly after the can is leaving the heated zone the lever 31 is released by sliding under the curved end of the bar 38 which is designated 43, acts like a cam and releases the lever. Another operator stationed at D removes the completed can from the flights.

What I claim is:

1. A handle soldering machine comprising an endless belt or chain having a plurality of supports on which cans may be mounted, a clamp adapted to press a handle member on to the top of the can, means extending partially around the belt for releasing the clamp and means for applying heat to the handle and can when the clamps are set.

2. A handle soldering machine comprising an endless belt or chain, a driving sprocket at one end, an idler sprocket at the opposite end, having a plurality of radial burners rotating therewith, a series of can supports on said belt, a clamp movable with said belt, adapted to press a handle member onto the top of the can, a fixed release bar extending partially around the belt for releasing the clamps except when the cans are exposed to the heat of the radial arms.

In witness whereof, I have hereunto set my hand this 17th day of December, 1919.

ROLLIN L. DRAKE.